March 4, 1947.　　　J. MEYER　　　2,416,837
ABRADING MACHINE FOR PEELING POTATOES
Filed April 15, 1943
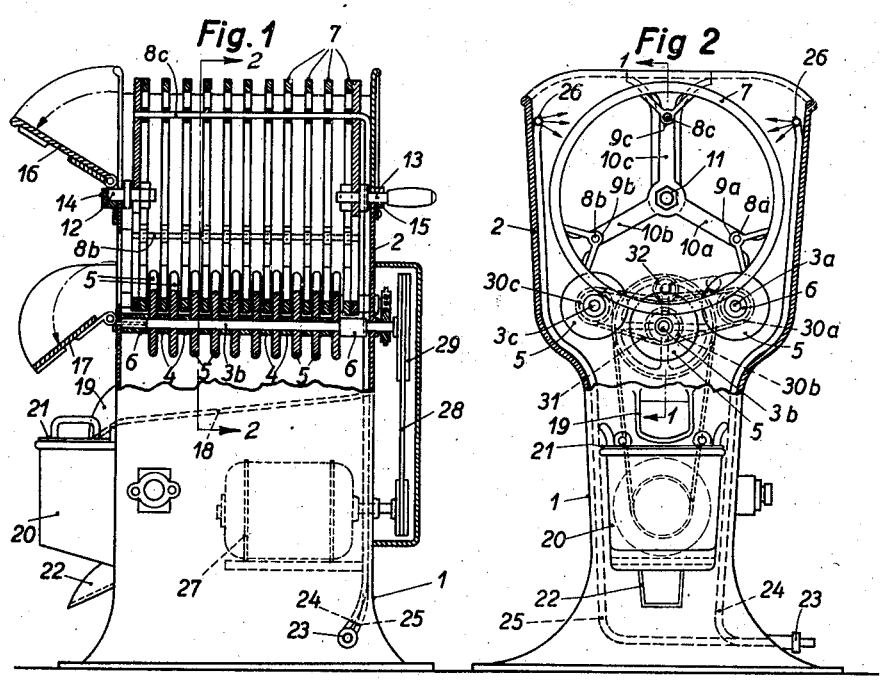
Inventor
Josef Meyer Patented Mar. 4, 1947

2,416,837

UNITED STATES PATENT OFFICE 2,416,837

ABRADING MACHINE FOR PEELING POTATOES

Josef Meyer, Dietikon, Switzerland

Application April 15, 1943, Serial No. 483,147
In Switzerland May 2, 1942

2 Claims. (Cl. 146—49)

This invention relates to machines for peeling fruits and agricultural products.

Machines for peeling potatoes are already known, which are known machines provided with a drum, either lined with carborundum on its inner surface or otherwise roughened, into which potatoes are brought, whereby peeling takes place by rubbing the potatoes on the inner surface of this rapidly rotating drum. The disadvantage of these peeling-machines is that indented parts of the potatoes are not peeled, inasmuch as they are not reached by the inner surface of the drum. Only in case the machine is allowed to run until all unevennesses and dents of the potatoes are removed, complete peeling is possible. However, this would incur a very considerable and unbearable loss of substance. This disadvantage is eliminated by means of the present invention.

The object of the present invention is, in principle, a peeling-machine for potatoes etc., consisting of a horizontal, cylindrical container intended to receive the material to be peeled and, at least, of one row or series of rotating peeling-tools, positioned on a shaft parallel to the axis of the container and outside of the container, for the purpose of peeling the rolling material in the container.

According to the present invention, peeling of the material does not take place on the inner surface of a drum, but is effected by means of the special peeling-tools. These peeling-tools allow indented, uneven parts of potatoes etc. to be treated and, therefore, it is possible to peel them, without any excessive waste.

Two preferred embodiments of the invention are shown in the accompanying drawing in which:

Fig. 1 is a partially sectioned side view of a peeling machine according to the invention, the section taken in plane of the line 1—1 of Fig. 2; and Fig. 2 is a partially sectioned front view of same, the section taken in the plane of the line 2—2 of Fig. 1.

Referring now to the drawing, a body or casing 2 is mounted on a pillar 1. Three shafts 3a, 3b, and 3c are positioned in this body 2, and on each of these shafts a row or series of carborundum-discs 5, forming the peeling-tools, is arranged in such a manner that the carborundum-discs are kept apart from each other by means of distance-keeping rings 4. Both outer shafts 3a and 3c carry rolls 6 on both sides between carborundum-discs 5 and their bearings in body 2. A container formed by rings 7, kept at a distance from each other, rests on these rolls 6, whereby the carborundum-discs 5 operate upon the container between rings 7. Rings 7 are connected with each other by means of three rods 8a, 8b, and 8c, which are held in brackets 9a, 9b, and 9c, mounted inwardly on the rings 7, whereby rods 8a, 8b, and 8c do not come into contact with the carborundum-discs 5, when the container rotates. The outermost ring 7 on each side of the container is provided with spokes 10a, 10b, and 10c, and also with a nave 11, the axle journals 12 and 13 being supported, respectively, in the front wall of the body 2 in a bearing 14, which is open in the upper part, and in the backwall of this body in a bearing 15, whereby the container mounted on the rolls 6 is held in its position.

The body 2 is provided with a filling-hole, which is closed by means of a flap-lid 16, and the material to be peeled is brought to the container through this filling-hole. The body 2 is also provided with an ejection-hole, which is closed by means of a flap-lid 17, through which hole the peeled material is removed. The casing or body 2 has a bottom 18 and an outlet 19 in the front wall. This outlet 19 is above a screen box 20 mounted on the front-side of pillar 1 and contains a screen-basket 21. Screen-box 20 is arranged with a vent 22. The foot-end of pillar 1 is provided with a connection 23 for water-supply. In the interior of pillar 1 two tubes 24 and 25 lead from this connection 23 to two spraying nozzles 26, in the upper part of body 2, on both sides of the container and parallel to same, their jets of water being directed towards the material to be peeled in between rings 7.

The drive of the peeling-machine is effected by an electro-motor 27 positioned in pillar 1. This electro-motor 27 drives shaft 3b by means of a wedge-shaped driving-belt 28 and a wheel 29 mounted on shaft 3b. The shafts 3a, 3b, and 3c are provided with chain-wheels 30a, 30b, and 30c, which are connected by a chain 31, on which a span-roll 32 also acts, whereby the three shafts 3a, 3b, and 3c are driven in the same sense.

The material to be peeled is brought to the container through the filling-hole and, subsequently, lids 16 and 17 are closed. If the electromotor is now switched on, shafts 3a, 3b, and 3c, which carry the peeling-tools, are set into motion. The container mounted on the rolls 6, which rotate in the same sense as shafts 3a and 3c, is also set into motion. The material to be peeled is thoroughly rolled and thrown about in the lower part of the body, whereby it is peeled by the carborundum-discs 5 which project into the container. These carborundum-discs 5 of comparatively small diameter can also reach the indented parts of the material to be peeled and, therefore, no part of the material escapes peeling. Whilst being peeled, the material is washed by means of the nozzles 26, whereby the waste removed by the peeling-tools is washed away through the outlet 19 into the screen-basket 21.

Instead of carborundum-discs 5, rubber-discs containing emery-sand on their surface, or metal-discs with a roughened surface can also be used as peeling-tools. It is also possible to employ roughened surface discs of wave-like, but not round, circumference as peeling-tools. Furthermore, the peeling-tools must not necessarily be composed of discs, but also of carborundum-plugs arranged in a star-shaped manner, or of file-like plugs. The interior of the container for the material to be peeled may be padded, in order to protect the material to be peeled.

What I claim is:

1. A machine for peeling fruits and agricultural products comprising a series of rings spacedly and rotatably mounted on a horizontally extending axis and interconnected by means of rods carried in brackets located inwardly of the rings, said rings serving as a container for the material to be peeled, said brackets and rods aiding said material to be kept in motion, means between the rings for spacing them from each other, at least one series of peeling discs spacedly and rotatably mounted on a shaft located outside of the rings and extending parallel to said axis, said shaft and peeling discs being arranged so that portions of the peeling discs project between the rings into the container, and means for rotating said peeling discs and container-forming rings.

2. A machine for peeling fruits and agricultural products comprising a series of rings spacedly and rotatably mounted on a horizontally extending axis and serving as a container for the material to be peeled, means between the rings for spacing them from each other, at least one series of peeling discs spacedly and rotatably mounted on a shaft located outside of the rings and extending parallel to said axis, said peeling discs being from carborundum, said shaft and peeling discs being arranged so that portions of the peeling discs project between the rings into the container, and means for rotating said peeling discs and container-forming rings.

JOSEF MEYER.

REFERENCES CITED

The following references are of record in the file of this patent:

UNITED STATES PATENTS

| Number | Name | Date |
| --- | --- | --- |
| 1,062,935 | Trust | May 27, 1913 |
| 1,441,161 | McCabe | Jan. 2, 1923 |
| 946,196 | Bills | Jan. 11, 1910 |
| 1,012,129 | Fast | Dec. 19, 1911 |
| 1,926,705 | Urschel | Sept. 12, 1933 |
| 2,021,970 | Urschel | Nov. 26, 1935 |
| 2,009,627 | Laib | July 30, 1935 |
| 633,486 | Rader | Sept. 19, 1899 |

FOREIGN PATENTS

| Number | Country | Date |
| --- | --- | --- |
| 35,921 | French | Dec. 19, 1929 |
| 128,802 | British | July 3, 1919 |